US006822961B1

(12) United States Patent
Constantinof et al.

(10) Patent No.: US 6,822,961 B1
(45) Date of Patent: Nov. 23, 2004

(54) METHOD AND APPARATUS FOR REDUCTION OF CALL SETUP RATE IN AN ATM NETWORK

(75) Inventors: Cristian M. Constantinof, Kanata (CA); Brian J. N. Vaughan, Ottawa (CA); Vladimir Mikhailov, Nepean (CA); Mingxing Li, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/165,189

(22) Filed: Oct. 2, 1998

(51) Int. Cl.[7] .............................................. H04L 12/28
(52) U.S. Cl. .................... 370/395.2; 709/223; 709/230; 709/238; 709/245
(58) Field of Search .............................. 370/230, 231, 370/232, 236, 389, 396, 397, 398, 401, 395, 399, 395.1, 395.2; 709/223, 224, 230, 236, 238, 245

(56) References Cited

U.S. PATENT DOCUMENTS

| 5,179,556 | A | * | 1/1993 | Turner | 370/233 |
| 5,455,826 | A | * | 10/1995 | Ozveren et al. | 370/232 |
| 5,463,621 | A | | 10/1995 | Suzuki | 370/60 |
| 5,528,592 | A | | 6/1996 | Schibler et al. | 370/60.1 |
| 5,719,863 | A | | 2/1998 | Hummel | 370/392 |
| 5,787,086 | A | * | 7/1998 | McClure et al. | 370/413 |
| 6,094,687 | A | * | 7/2000 | Drake et al. | 709/241 |
| 6,195,714 | B1 | * | 2/2001 | Li et al. | 710/31 |
| 6,222,842 | B1 | * | 4/2001 | Sasyan et al. | 370/397 |
| 6,252,857 | B1 | * | 6/2001 | Fendick et al. | 370/254 |
| 6,275,493 | B1 | * | 8/2001 | Morris et al. | 370/395 |
| 6,304,577 | B1 | * | 10/2001 | Nagami et al. | 370/409 |
| 6,434,152 | B1 | * | 8/2002 | Yamamura | 370/395 |

FOREIGN PATENT DOCUMENTS

| EP | 0 603 915 A2 | 12/1993 | H04Q/11/04 |

OTHER PUBLICATIONS

Tatsuhiko Yoshida, et al., "A Study on the Management Information Model For ATM Bandwidth Control", Jun. 18, 1995, pp. 132–137, IEEE 1995.

* cited by examiner

Primary Examiner—Steven Nguyen
Assistant Examiner—Roberta Stevens
(74) Attorney, Agent, or Firm—Max R. Wood; Ogilvy Renault

(57) ABSTRACT

A method and apparatus for reduction of call setup rate in an ATM network are described. The method and apparatus are particularly useful in ATM networks used for the transfer of bearer traffic between telephone switching offices. The method involves caching a number of switched virtual circuits (SVCs) between edge interfaces to the ATM network. A cache connection is an emulated circuit between two edge interfaces that is available and idle. The apparatus provides a central policy manager which computes and distributes cache policies to cache managers located in the edge interfaces. The cache managers manage pools of cached SVCs established between two edge interfaces. The method and apparatus reduces the number of connection setup requests sent to the ATM switches. The advantage is the ability to use ATM switches which have slow connection setup rates to provide commercially acceptable telephone services in an efficient manner. The method can also be used with fast ATM switches when they become available to balance the use of bandwidth and switch resources to reduce overall cost.

44 Claims, 10 Drawing Sheets

METHOD AND APPARATUS FOR REDUCTION OF CALL SETUP RATE IN AN ATM NETWORK

TECHNICAL FIELD

This invention relates to the use of asynchronous transfer mode (ATM) facilities for the transfer of synchronous transfer mode (STM) bearer traffic and, in particular, to the use of cached switched virtual circuits (SVCs) to facilitate connection setup through the ATM network.

BACKGROUND OF THE INVENTION

Introduction of the Internet to the general public and the ensuing explosion of interest and demand for access to the Internet through telephone service provider networks has placed considerable strain on existing telecommunications facilities. In addition, telephone service provider networks are now being overwhelmed by the explosion of data traffic over an infrastructure that was not intended for and is not capable of supporting the exponential increase in demand currently being experienced.

Consequently, a keen interest has developed among telephone service providers for increasing network capacity by off-loading at least a portion of the calls handled to an alternate bearer traffic transport. Currently, asynchronous transfer mode (ATM) networks are considered to be the most likely candidate for service as an alternate bearer traffic network. ATM networks have the flexibility to efficiently transfer both voice and data between time division multiplex (TDM) switches.

Although ATM networks possess the required flexibility to handle the current bearer traffic mix in the public switched telephone network (PSTN), the ATM network is not well suited to provide call connection services at the speed to which PSTN subscribers have become accustomed. The establishment of a virtual connection across an ATM network may introduce unacceptable delays in call setup, depending on the number of ATM nodes involved in the SVC and the call setup request rate. Consequently, before a significant volume of traffic can be transferred to an ATM backbone, some method of facilitating call setup is required if customer satisfaction is to be ensured. One method of ensuring rapid call completion is to utilize permanent virtual circuits (PVCS) or permanent virtual paths (PVPs) in the ATM network to facilitate call setup. Since the PVCs and PVPs are preconfigured, call setup rates easily meet customer expectations. There is a significant drawback to using PVCs or PVPs for bearer traffic transfer through an ATM network, however. The PVCs and PVPs, much like PSTN voice trunks, consume resources regardless of their occupancy. The PVCs and PVPs are also laborious to maintain and the operations and maintenance requirement contributes to overhead.

Consequently, it is accepted that SVCs are preferred for the transfer of bearer traffic through an ATM network. A network Working Group Internet-draft document published on the Internet in October, 1997 proposes a rudimentary ATM SVC caching method in which virtual circuits are cached in pools of unspecified bit rate connections for transferring IP packets over an ATM backbone network. The paper does not explain how the cached SVCs are established or maintained. A problem with the proposal in the draft document is that it does not describe any dynamic method for managing cached SVCs to balance bandwidth usage and switch resource usage to ensure efficient use of resources. A method and apparatus for caching SVCs to rapidly establish a communication connection through an ATM network was also described in applicants' copending U.S. patent application Ser. No. 09/053,682 filed Apr. 2, 1998. In accordance with that method, the SVCs were established and controlled within the ATM network. While the method is both efficient and effective, it requires minimal functionality in the ATM network which may not be universally available. Consequently, it is desirable to provide a method and apparatus for reduction of call setup rate in an ATM network which is entirely ATM network-independent to permit the method and apparatus to be universally applied for the transfer of switched telephone network bearer traffic over an ATM backbone network.

SUMMARY OF THE INVENTION

It is an primary object of the invention to provide a network-independent method and apparatus for reduction of call setup rate in an ATM network.

It is a further object of the invention to provide a method and apparatus whereby SVC setup and control is effected in edge device interfaces to the ATM network.

It is yet another object of the invention to provide a method and apparatus for centrally controlling the edge device interfaces to exercise control of an SVC caching policy at a central operations and management facility.

It is yet a further object of the invention to provide a method and apparatus in which cached SVCs are organized in a plurality of cache pools, a cache pool existing between a first and second edge device with which the SVCs are established.

It is a further object of the invention to provide a method and apparatus in which the caching policy manager executes an algorithm to determine the number of cached SVCs that are to be included in each cached SVC pool.

It is yet a further object of the invention to provide an apparatus and method in which each pool of cached SVCs is managed by a separate instance of a caching manager.

It is yet another object of the invention to provide a method and apparatus in which each cache pool has a master caching manager located at a first end of the pool and a slave caching manager located at an opposite end of the cache pool.

These and other objects of the invention are realized in a method for reducing call setup rate in an asynchronous transfer mode (ATM) network where edge devices serve as interfaces for ingress and egress of bearer traffic from other networks, comprising:

maintaining at each edge device a pool of cached switched virtual circuits (SVCs) for the transfer of bearer traffic through the ATM network, and dynamically adjusting the number of cached SVCs in the pool of cached SVCs by adding SVCs to the pool when bandwidth usage is low with respect to switching resource usage, and removing SVCs form the pool when bandwidth usage is high with respect to switch resource usage.

The invention also provides a method for reducing call setup rate in an asynchronous transfer mode (ATM) network where edge devices serve as interfaces for ingress and egress of bearer traffic from other networks, comprising:

maintaining at each edge device a plurality of pools of cached switched virtual circuits (SVCs) for the transfer of bearer traffic through the ATM network, the plurality of pools at a first edge device respectively containing cached SVCs for connections between the first edge device and second edge devices that respectively serve as interfaces for the ingress and egress of the bearer traffic; and when a bearer traffic connection is passed to one of the first or second edge devices, one of the cached SVCs in an appropriate pool is selected to serve the call if a cached SVC exists in the appropriate pool.

In accordance with a further aspect of the invention there is provided an apparatus for reducing call setup rate in an asynchronous transfer mode (ATM) network where edge devices serve as interfaces for ingress and egress of bearer traffic from other networks, comprising:

a caching manager active on each edge device for managing a pool of cached SVCs between the edge device and other edge devices in the network; and a caching policy manager for providing the caching managers with caching policy to determine a maximum cache size for each pool of cached SVCs in the ATM network.

The method and apparatus in accordance with the invention provide a network-independent control of switched virtual circuits to reduce call setup rate in an ATM network by establishing and maintaining pools of SVCs through the ATM network. Each pool of SVCs is preferably managed from each edge device interface by a separate instance of a caching manager which receives operational parameters from a centralized caching policy manager. The caching policy manager is preferably adapted to designate a master and a slave caching manager for each pool. The behaviour of the caching manager being dependent on its designation as master or slave.

Each cache pool is preferably a dynamic cache. A dynamic cache consists of one or more SVCs established between two end points that are available and idle. In addition to the dynamic cache, a number of active connections may also exist between the same end points. An active connection that becomes idle may be returned to the cache, and reused in any subsequent call setup.

Since SVC caching is effected in the edge device interfaces, the method and apparatus in accordance with the invention are network-independent and adapted for use with any ATM network. The edge device interfaces in accordance with the invention are preferably equipped to interface with TDM switches in telephone service provider networks. In a preferred embodiment of the invention, the interfaces may be connected by a single large trunk group to the TDM switches in order to minimize trunk management overhead. While this arrangement facilitates management of the TDM switch, it potentially contributes to cache fragmentation if the TDM switch requires more than one edge device interface to serve traffic load. The invention therefore further provides methods and apparatus for reducing cache fragmentation by consolidating edge device interfaces into a single large logical edge device interface. Alternatively, multiple trunk groups respectively dedicated to a predetermined subset of the bearer traffic may be used for the same purpose.

BRIEF DESCRIPTION OF THE DRAWINGS

The invention will now be explained by way of example only and with reference to the following drawings, wherein.

DETAILED DESCRIPTION OF THE PREFERRED EMBODIMENT

The invention relates to a method and apparatus for the reduction of call setup rates in an ATM network using cached SVCs to reduce call setup time. In order to provide a network-independent system, the SVC caching control and management is independent of the ATM network and located in edge device interfaces which convert time division multiplexed pulse code modulated data associated with switched telephone network calls to ATM cells, and vice versa. The edge device interfaces are adapted for the connection of TDM trunks and ATM links to ensure independence from either network. Although the description which follows refers exclusively to the transfer of telephone network bearer traffic through an ATM backbone network, it will be understood by those skilled in the art that the interfaces may be used to transfer data from other networks through an ATM backbone. For example, the interfaces may be adapted for the transfer of Internet Protocol (IP) packets through the ATM network. They may also be adapted to enable the transfer of data in other protocols through other connection-oriented networks. Likewise, the method and apparatus described below may be used for caching SVC's for other types of connection-oriented traffic besides switched telephone calls.

System Overview

Figure 1:
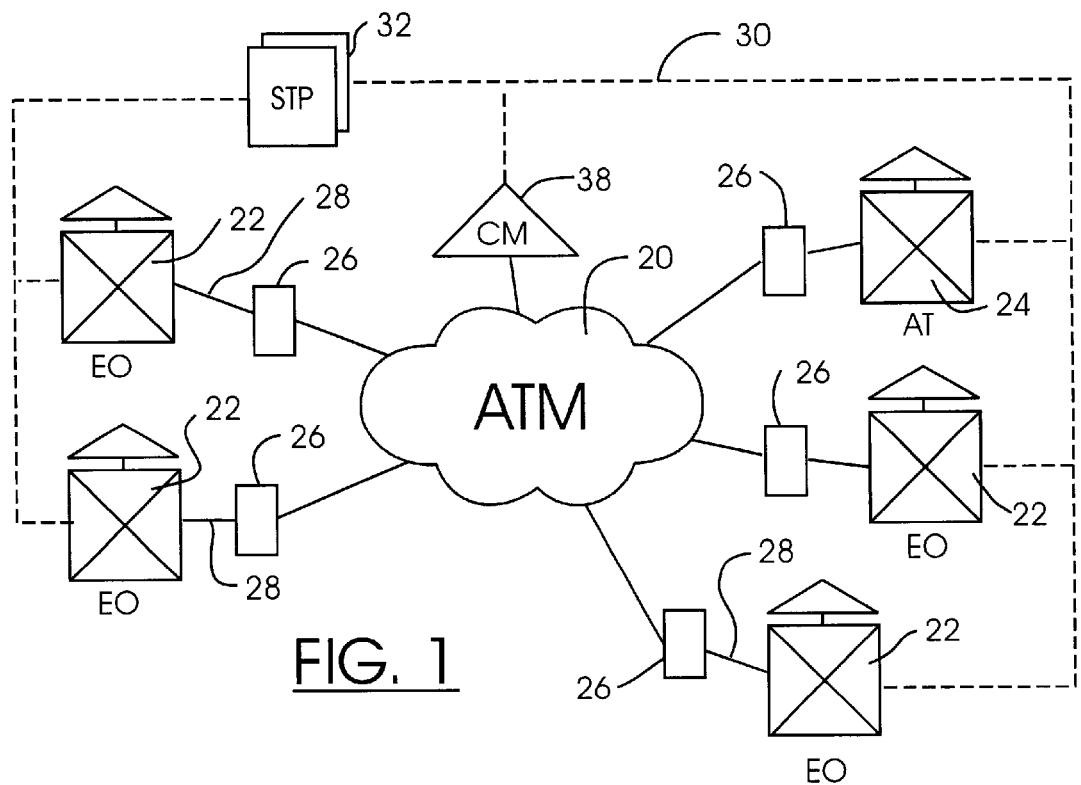
FIG. 1 is a schematic diagram illustrating an ATM network configured with edge device interfaces in accordance with the invention to enable switched telephone network bearer traffic to be transferred through the ATM network.

FIG. 1 is a schematic diagram illustrating an ATM network 20 configured with edge device interfaces in accordance with the invention to enable switched telephone network bearer traffic to be transferred through the ATM network. A plurality of telephone switching offices such as end offices 22 and access tandem 24 are connected to the ATM network 20 by edge device interfaces 26 which convert pulse code modulated (PCM) data to ATM cells, and vice versa, in a manner well known in the art. The edge device interfaces 26 may be, for example, multi-service inter-working units which are also adapted to convert other types of data from other networks for transfer through the ATM network 20. For example, the edge device interfaces 26 may also be adapted to convert IP packets to ATM cells and vice versa.

The edge device interfaces 26 are connected to the telephone switching offices 22, 24 by trunk groups 28 which may respectively be single logical trunk groups or a plurality of trunk groups, as will be explained below in more detail. As is well understood in the art, the telephone switching offices 22, 24 are interconnected by a common channelling signalling network 30, typically a Signalling System 7 (SS7) network which includes one or more signal transfer points (STP) 32 which forwards SS7 signalling packets from senders to receivers in a manner well known in the art. In accordance with the preferred implementation of the invention, the SS7 network 30 is also connected to a call manager server 38, hereinafter referred to simply as call manager 38. The call manager 38 likewise has an interface to the ATM network 20 to permit communication with the edge device interfaces 26 as will likewise be explained below in more detail.

Figure 2:
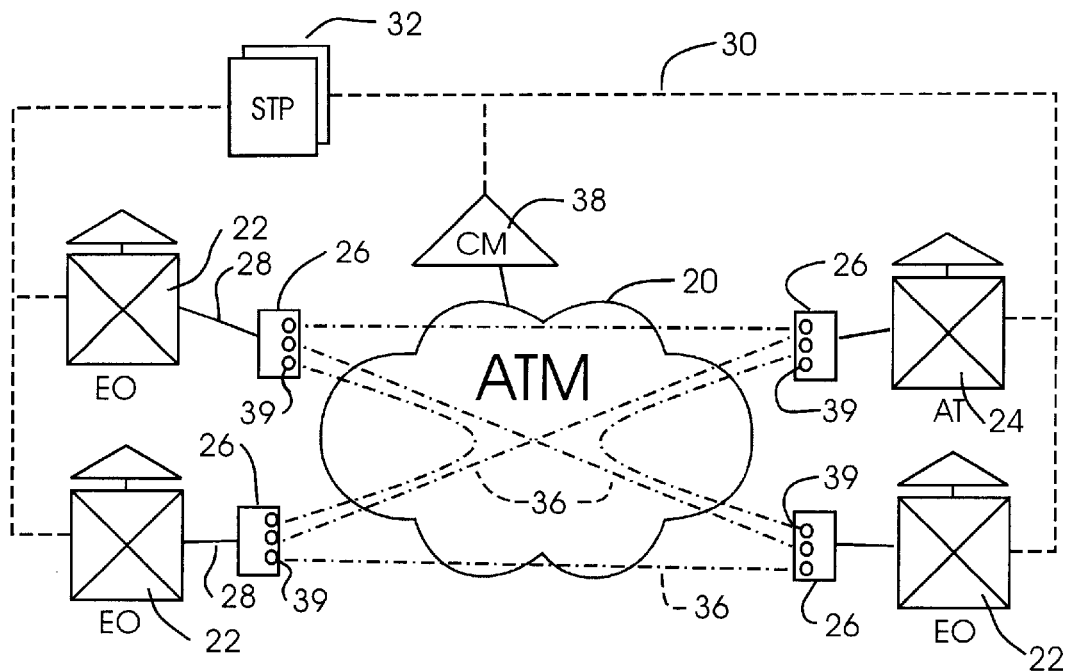
FIG. 2 is a schematic diagram of cached switched virtual circuits established between edge device interfaces in accordance with the invention.

In order to facilitate call setup rates while efficiently using available bandwidth in the ATM network 20, the edge device interfaces 26 in accordance with the invention are enabled to establish and maintain cached switched virtual circuits (SVCs) through the ATM network 20, as illustrated in FIG. 2. As used in this document, a cached SVC is an emulated circuit (ATM SVC) between two edge device interfaces 26 which is available and idle. In addition to a number of cached SVCs, any number of active connections may also exist between the same edge device interfaces 26 as part of the same resource pool. Cache management endeavours to balance the use of bandwidth and switching resources by optimizing the number of cached connections between each pair of edge device interfaces 26.

As shown in FIG. 2, cache connections 36, hereinafter referred to as cache pools 36, are established between each edge device where traffic volume warrants. Consequently, each edge device 26 supports and maintains a plurality of cache pools 36. Each cache pool 36 is shared with another edge device interface 26 with which the SVCs are established. A cache manager 39 manages each cache pool 36. In accordance with a preferred embodiment of the invention, an instance of the cache manager 39 manages each cache pool so that each cache pool 36 is managed as a separate logical entity. Cache pool management will be described below in more detail with respect to FIGS. 5-7.

In order to facilitate and simplify cache pool management, it is advantageous to designate one of the cache pool managers 39 in each respective cache pool 36 as master and one as slave. The master cache pool manager 39 controls the use of SVC resources. Although each cache pool manager maintains a table indicating the SVCs in cache, the master cache pool manager determines which SVC will be used for any particular connection request and determines when new SVCs will be added to a cache pool or deleted from the cache pool. The designation of any instance of the cache manager 39 as master or slave is substantially arbitrary. For example, the designations may be accomplished on initialization by a central operations and management utility, and is desirably automated. A simple algorithm may be used to designate the master/slave relationship in which some unique identifier such as an E.164 address of the respective edge device interfaces 26 of each cache pool is used to designate a master of the cache pool by, for example, selecting as master the instance of the cache manager that resides on the edge device interface with the E.164 address having a last digital value of the two addresses.

Inter-Device Signalling

Figure 3:
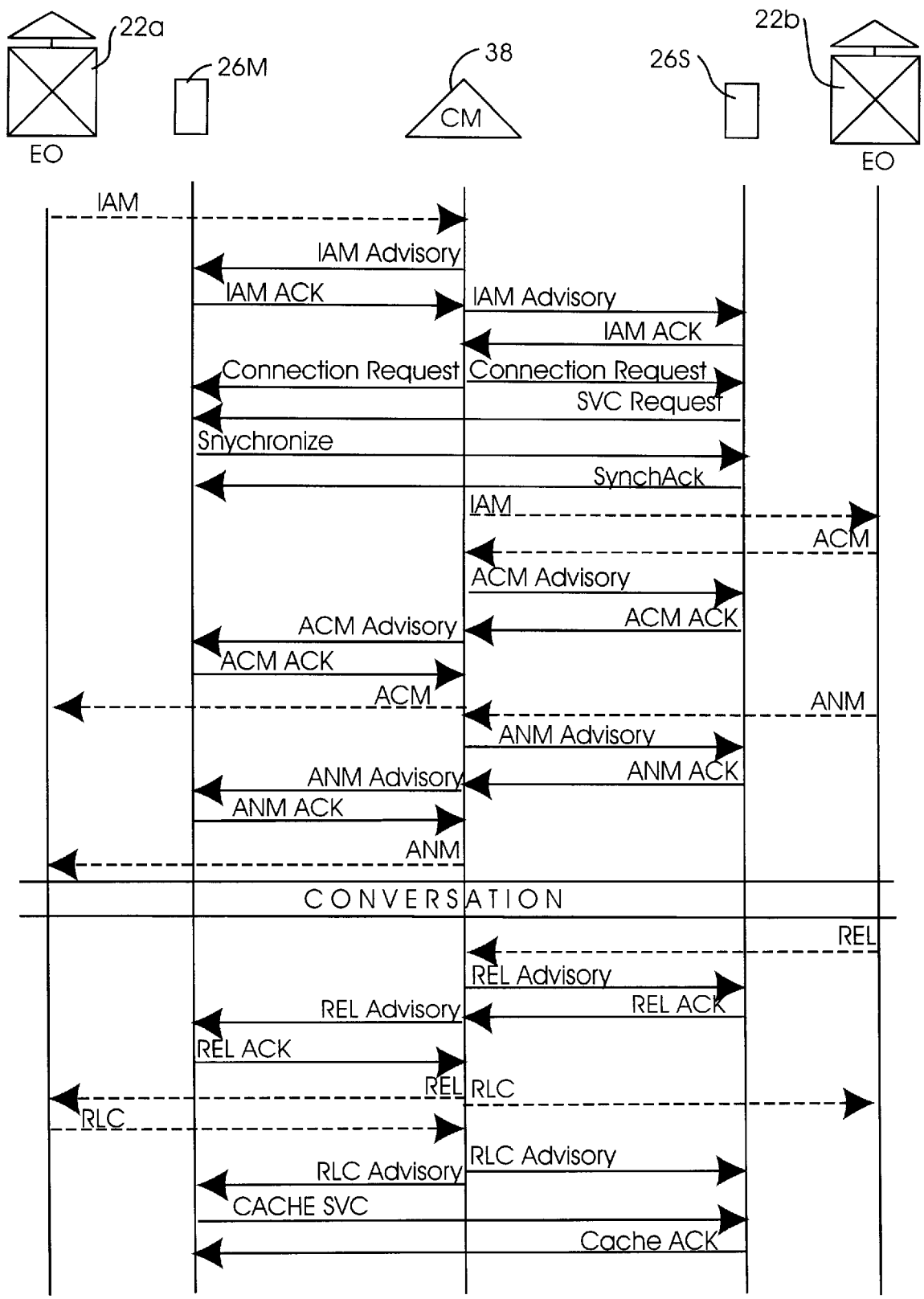
FIG. 3 is a schematic diagram illustrating a signalling sequence for connection setup using cached SVCs when a connection request originates at an edge device interface having an instance of a caching manager designated as master of the cache pool.

FIG. 3 is a schematic diagram illustrating a simplified signalling sequence for connection setup using cached SVCs when a connection request originates at an end device interface having an instance of a caching manager designated as a master of the cache pool. For purposes of example, it is assumed that the ATM network 20 (FIG. 1) is connected to an associated call manager 38 which transparently managers call connections between the telephone switching offices 22, 24 without direct interaction with the ATM switches. The arrangement and operation of such a network is described in Applicant's co-pending patent application entitled TRANSIT TRUNK SUBNETWORK which was filed on 23 Sep. 1998 and assigned application Ser. No. 09/158,855, the specification of which is incorporated herein by reference in its entirety.

As is shown in FIG. 3, the edge device 26M is the master of a cache pool shared with the edge device 26S. Edge device 26M serves end office 22a and edge device 26S serves end office 22b. A call originates at end office 22a. In response to the call, the end office 22a formulates an SS7 Initial Address Message (IAM) and forwards the IAM over the SS7 network to the call manager 38. The call manager 38 extracts information from the IAM and determines from the called number that the call should be terminated at end office 22b using edge device interface 26S. The call manager 38 uses the information extracted from the IAM to locate the edge device interface to handle the call origination and sends an IAM advisory message to the edge device interface 26M. On receipt of the IAM advisory message, the edge device interface 26M verifies the availability of resources and responds with an IAM ACK (acknowledge). The call manager 38 then sends on IAM advisory to the terminating edge device interface 26S which performs a verification of the availability of resources and responds with an IAM ACK. Immediately thereafter, call manager 38 sends a connection request to the edge device interfaces 26S, 26M. The connection request message may be sent exclusively to the terminating end at edge device interface 26S or sent to each of the edge device interfaces 26S, 26M. For reasons that will be understood by those skilled in the art, it is advantageous to effect backward call setup through the ATM network if the ATM network is organized in a plurality of subnets, respectively managed by a call manager 38. In that case, a terminating edge device interface 26 has all the information required to set up a backward connection through the ATM network whereas the edge device serving the originating switch does not. It should also be noted that depending on the organization of the ATM network 20 (FIG. 1) backwards setup may not be required or advantageous and is not essential to the operation of the invention. In the example shown in FIG. 3, the connection request message is sent to each of the edge device interfaces 26S, 26M. The connection request message sent to edge device interface 26S includes:
   TDM path ends at edge device interface 26M and 26S;
   endpoint address of edge device interface 26M; and
   other miscellaneous information.

The connection request message sent to edge device interface 26M includes:
   TDM path ends at edge device interface 26S and 26M;
   endpoint address of edge device interface 26S; and
   other miscellaneous information.

On receipt of the Connection Request message, the edge device interface 26S, being a slave in the cache pool relationship formulates an SVC Request message and transmits it to the edge device interface master 26M. A System Management (OAM) cell may be used for this purpose. The OAM cell may be sent over any idle SVC to the cache master end. If no idle SVC is available, the edge device interface 26S may, for example, perform one of the following:
   edge device interface 26S may create a new SVC which the cache master 26M would accept as part of the cache pool it controls; or
   the OAM cell-setup request may be inserted in an in-use SVC assuming that no issue exists with respect to assigned VC bandwidth.

On receipt of the SVC Request message, the cache manager at edge device interface 26M selects an available SVC from the cache and sends a Synchronize message over the SVC to inform the edge device interface 26S that that SVC is to be used to serve the call. The edge device interface 26S responds to the Synchronize message with a SynchAck message. Concurrently, the call manager 38 forwards the IAM to the terminating end office 22b. On receipt of the IAM, end office 22b verifies that the called party line is available. The end office 22b then returns an Address Complete Message (ACM) to the call manager 38. On receipt of the ACM message, call manager 38 forwards an ACM advisory message to the respective edge device interfaces 26S, M and receives an ACM ACK in return. On receipt of the respective ACM ACK messages, the call manager 38 forwards the ACM over the SS7 network to the end office 22a. When the called party answers, end office 22b formulates an Answer Message (ANM) which it forwards over the SS7 network 30 to the call manager 38. As with the ACM message, the call manager 38 responds to receipt of the ANM message by sending an ANM advisory message to each of edge device interfaces 26S, M and receives an ANM ACK in return. Call manager 38 then modifies the ANM message and forwards it to the end office 22a. Thereafter, conversation ensues across the completed call path.

In the example shown in FIG. 3, the called party goes on-hook first, so an SS7 Release (REL) message is sent from end office 22b to the call manager 38. The call manager 38 responds by sending an REL advisory message to the respective edge device interfaces 26S, M and receives an REL ACK message in return. The call manager 38 then modifies the REL message and forwards it to the end office 22a. The call manager 38 then returns a Release complete (RLC) message to the end office 22b to confirm the release. End office 22a likewise returns an RLC message to the call manager 38. On receipt of the RLC message, the call manager 38 sends an RLC advisory message to each of the edge device interfaces 26S, M. The cache manager at edge device interface 26M examines the size of the cache pool and determines that the SVC should be cached, as will be explained below with reference to FIGS. 7-9. Consequently, the cache manager at edge device interface 26M returns an OAM cell instructing the slave at edge device interface 26S to cache the SVC for later use. Although the signals exchanged in the examples shown in FIG. 3 use System Management OAM cells sent through the ATM network for inter-device signalling, other mechanisms may be used such as a control channel (not illustrated) or a Generic Application Transport (GAT) protocol which has been proposed as a messaging protocol standard to the ATM Forum.

Figure 4:
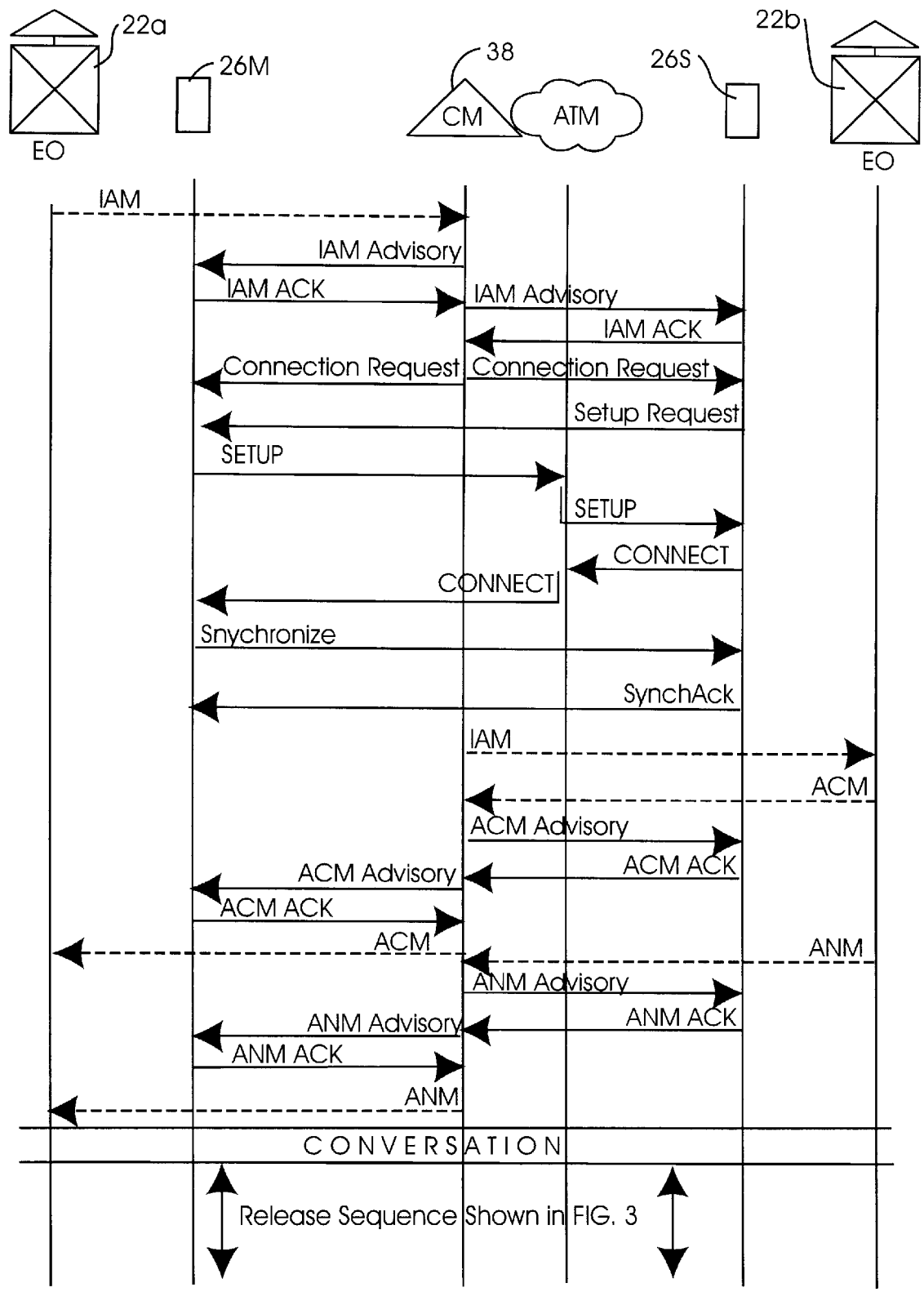
FIG. 4 illustrates the same signalling sequence when no cached SVC is available to serve the connection request and a new SVC must be established.

FIG. 4 shows the same call sequence shown in FIG. 3 with the exception that a cached SVC is not available and the cache master 26M is required to establish a new SVC to serve the call. As will be understood by those skilled in the art and as explained above with reference to FIG. 3, the SVC setup may be accomplished by the slave if no idle and available SVCs exist in the cache. In this example, however, the slave at edge device interface 26S inserts an OAM cell-setup request in an in-use SVC and the cache manager master at edge device interface 26M sets up the new SVC. As shown in FIG. 4, the setup is accomplished by a Setup message sent to the ATM network from edge device interface 26S. The ATM network does the necessary routing and sends an ATM Setup message to edge device interface 26S. The edge device interface 26S responds with a Connect message to the ATM network which responds by routing an ATM Connect message back to the edge device interface 26M. On receipt of the ATM Connect message, the edge device interface 26M sends a Synchronize message back to the edge device interface 26S and call processing continues as described above with reference to FIG. 3.

Figure 5:
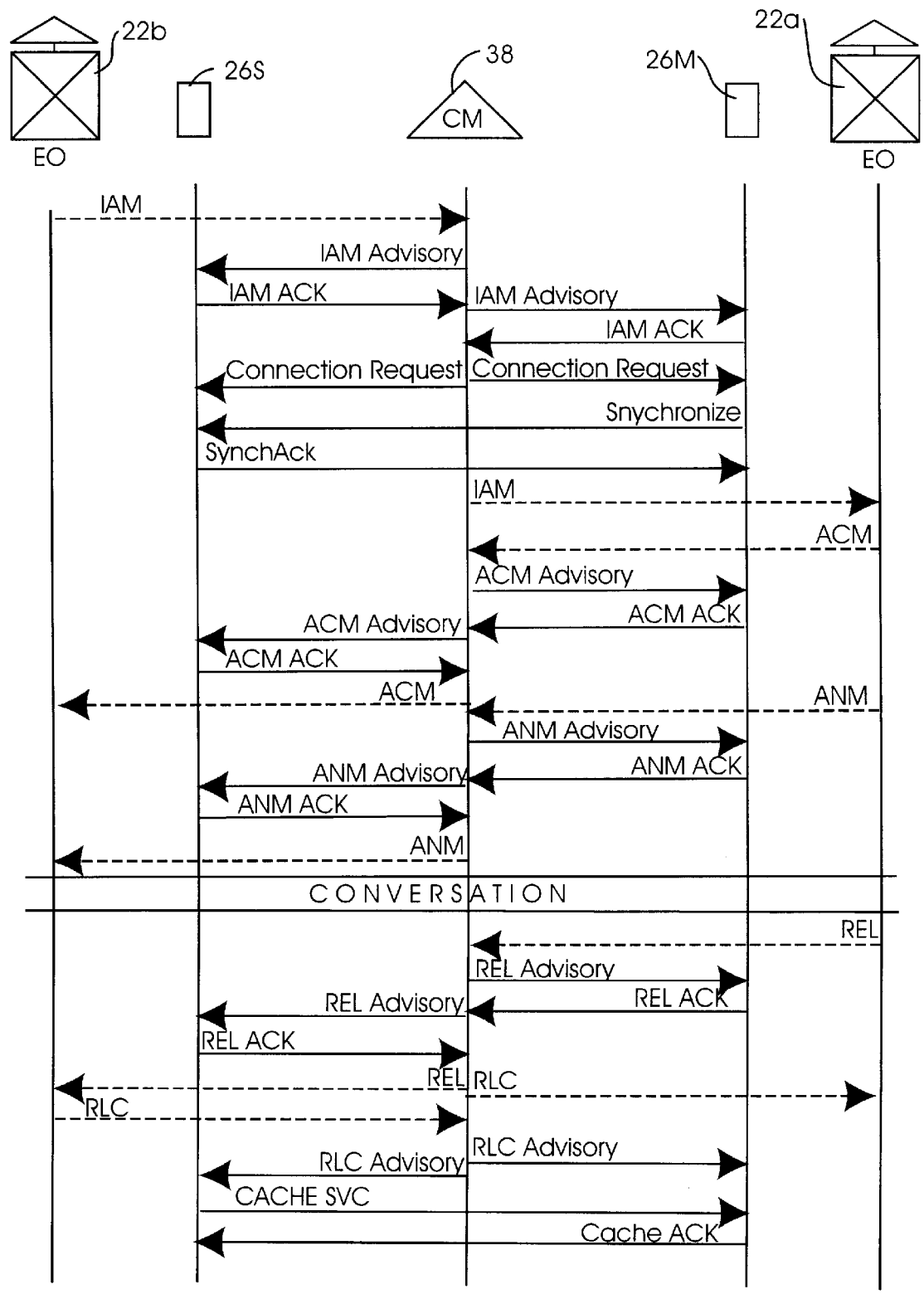
FIG. 5 is a schematic diagram of a signalling sequence illustrating an instance in which a call request originates at an edge device interface which is designated as slave manager of the cache pool.

FIG. 5 is a schematic diagram of a signalling sequence illustrating an instance in which a call request originates at an edge device interface which is designated as slave manager of the cache pool. The sequence in FIG. 5 is substantially the same as the sequence in FIG. 3 with the exception that edge device interface 26M is the terminating edge device interface for a call which originated at end office 22b and terminates at end office 22a. Since the call sequences are substantially identical, a description of each step is not provided. Attention is directed to the Synchronize message which is sent from edge device interface 26M to the edge device interface 26S. Since the master of the cache pool is the terminating edge device for the call, it inspects the cache table and selects an idle and available cached SVC. It then sends the Synchronize message over the selected SVC to the edge device interface 26S which returns a SynchAck message, as explained above with reference to FIG. 3. Thereafter, the call proceeds as described above.

Although the examples described above have related to arrangements in which one of the cache managers of the cache pool is designated as master and the other cache manager is designated as slave, the cache managers of the cache pool may also have a peer-to-peer relationship.

Figure 6:
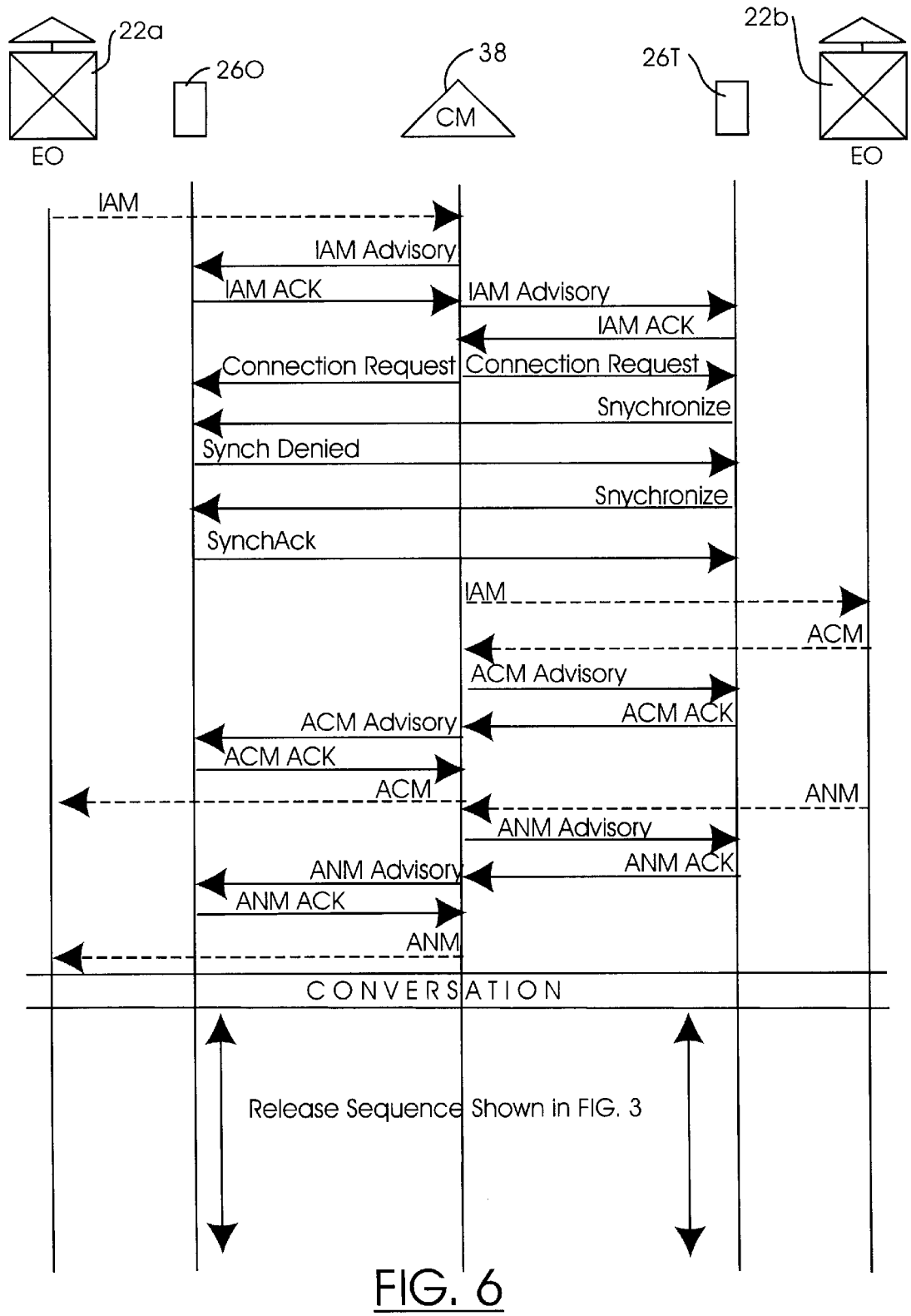
FIG. 6 is a schematic diagram illustrating a signalling sequence for connection setup when the cache managers at each of the edge device interfaces are peers.

FIG. 6 is a schematic diagram illustrating a signalling sequence for connection setup when the cache managers at each of the edge device interfaces are peers. As shown in FIG. 6, a call originates at end office 22a which formulates an IAM that is forwarded to the call manager 38. The call manager 38 extracts call information from the IAM and forwards an IAM advisory to each of edge device interface 26O (originating end) and edge device interface 26T (terminating end). The respective edge device interfaces 26O, T verify resource availability and return the IAM ACK messages as described above. Thereafter, the call manager 38 sends a Connection Request message to each of edge device interfaces 26T and 26O. On receipt of the Connection Request message, the cache manager at edge device interface 26T, selects an SVC from cache and sends a Synchronize message to the edge device interface 260. Since the edge device interfaces 26T, 260 operate as peers, a condition equivalent to "glare" can develop in which two cache managers select the same SVC at the same time for different calls. In the example shown in FIG. 6, the cache managers at edge device 26T and 260 select the same SVC at the same time. There are many ways in which such glare conditions can be resolved. In the example shown, the edge device interface 260 returns a Synch Denied message over the selected SVC, and the edge device interface 26T immediately selects another available SVC from the cache and repeats the Synchronize message over the newly selected SVC. In this example, no conflict exists with the second selection and the edge device interface 260 returns a SynchAck back to the edge device interface 26T indicating that the SVC has been accepted and call processing can continue. Thereafter, the call flow proceeds as described above with reference to FIG. 3.

Cache Management

Figure 7:
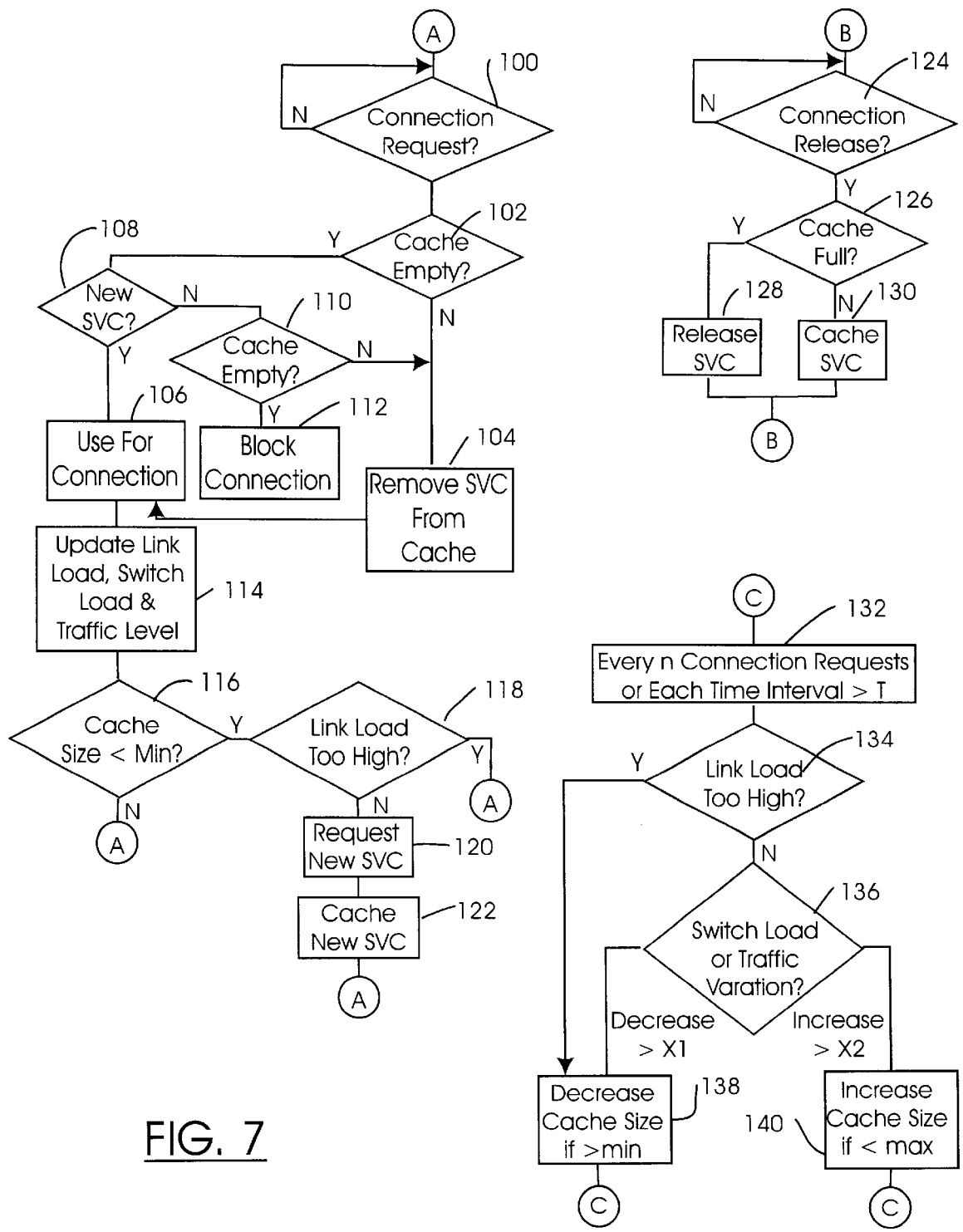
FIG. 7 is a flow chart illustrating a general overview of a preferred caching algorithm in accordance with the invention.

FIG. 7 is a flow chart illustrating a general overview of a preferred caching algorithm in accordance with the invention. In step 100, the caching manager 39 waits for a connection request to be received from call manager 38, as described above. On receipt of a connection request, the call manager determines in step 102 whether the cache contains an idle and available cached SVC to serve the connection request. If a cached SVC is available, the SVC is removed from cache in step 104 and mapped to the connection in step 106. If the cache is empty, the cache manager requests from a new SVC from the ATM network in step 108. If the ATM network has capacity to create the new SVC, it is mapped to the connection in step 106. If setup of a new SVC is denied, the cache manager checks cache once again in step 110 since there is a possibility that a call release has returned a connection to the cache during the time that the cache manager was waiting for a response from the ATM network respecting the setup of a new SVC. If the second inspection of the cache indicates that a cached SVC is available, it is removed from cache in step 104 and mapped to the connection in step 106. Otherwise, the connection is blocked in step 112 and the cache manager returns to the connection monitoring process in step 100.

When an SVC is used for a call in step 106, the cache manager updates link loading, switch loading and traffic level registers in step 114. The link loading, switching loading and traffic level registers are used in cache size management, as will be explained below. After the update in step 114, cache size is inspected in step 116 to determine whether the number of cached SVCs is less than a minimum cache size. A minimum and a maximum cache size are provided to each cache manager 38. Preferably, these values are provided to the cache manager by a central cache policy manager, as will be described below. The minimum and maximum cache values may also be supplied by a system administrator or determined dynamically by a central or local process. If cache size is determined to be less than the minimum cache size in step 116, the link load is checked in step 118 to determine whether it is greater than a predetermined value. If it is, the cache manager returns to the monitoring process in step 100. Otherwise, in step 120, the cache manager requests a new SVC setup from the ATM network and adds the SVC to the cache in step 122.

Concurrently, a separate process of the cache manager 38 monitors connection releases in step 124. When the cache manager 38 detects that a connection has been released, the cache manager checks in step 126 to determine whether cache is full, i.e., whether cache size is greater than the maximum cache size. If the cache is full, the SVC is released through the ATM network in step 128. If the cache is not full, in step 130 the caching manager adds the SVC to the cache and returns to the connection release monitoring process in step 130.

A third process executed by the cache manager 38 is responsible for cache size management. The cache size management process executes a simple algorithm every "n" calls or each time interval "T", or both. If the algorithm is executed every n calls, the cache size adaptation frequency changes with traffic load. If the algorithm is executed after the time interval T has elapsed, the algorithm is executed at a constant frequency. With a combined approach, the algorithm is executed in response to traffic load when traffic load is high and at predefined intervals when traffic load is low. In step 132, the parameter(s) determining the cache size management frequency is monitored and the cache management algorithm is executed when the parameter(s) meets the predetermined criteria. When the algorithm is executed, the link load register is compared with a predetermined limit to determine whether link load is too high. If so, the cache size is decreased in step 138 if the cache size is greater than the cache size minimum. Thus, high priority is given to the link loading level and cache size will not be increased even if switch loading is low or the number of connection requests is increasing. If in step 134 the link load is not determined to be too high, the switch load or traffic variation are examined in step 136. Either switch load or traffic variation may be used for a comparative examination to determine whether current switch load or current traffic load is increasing or decreasing with respect to a last time the algorithm was executed. For this purpose, the switch load and traffic level updated in step 114 is compared with a corresponding value saved when the algorithm was last executed. If a decrease greater than a predetermined value "X1" is detected in step 136, the cache size is decreased by one if in step 138 the cache size is greater than minimum cache size. If in step 136 the switch load or traffic load is determined to have increased beyond a second predetermined value "X2", then cache size is incremented by one in step 140 unless the cache size is already at maximum cache size. This algorithm dynamically adapts cache size to fluctuating traffic loads in order to ensure a dynamic balance of the use of bandwidth and switching resources by adding SVCs when bandwidth usage is low with respect to switching resource usage and removing SVCs from the pool when bandwidth usage is high with respect to switch resource usage.

Figure 8:
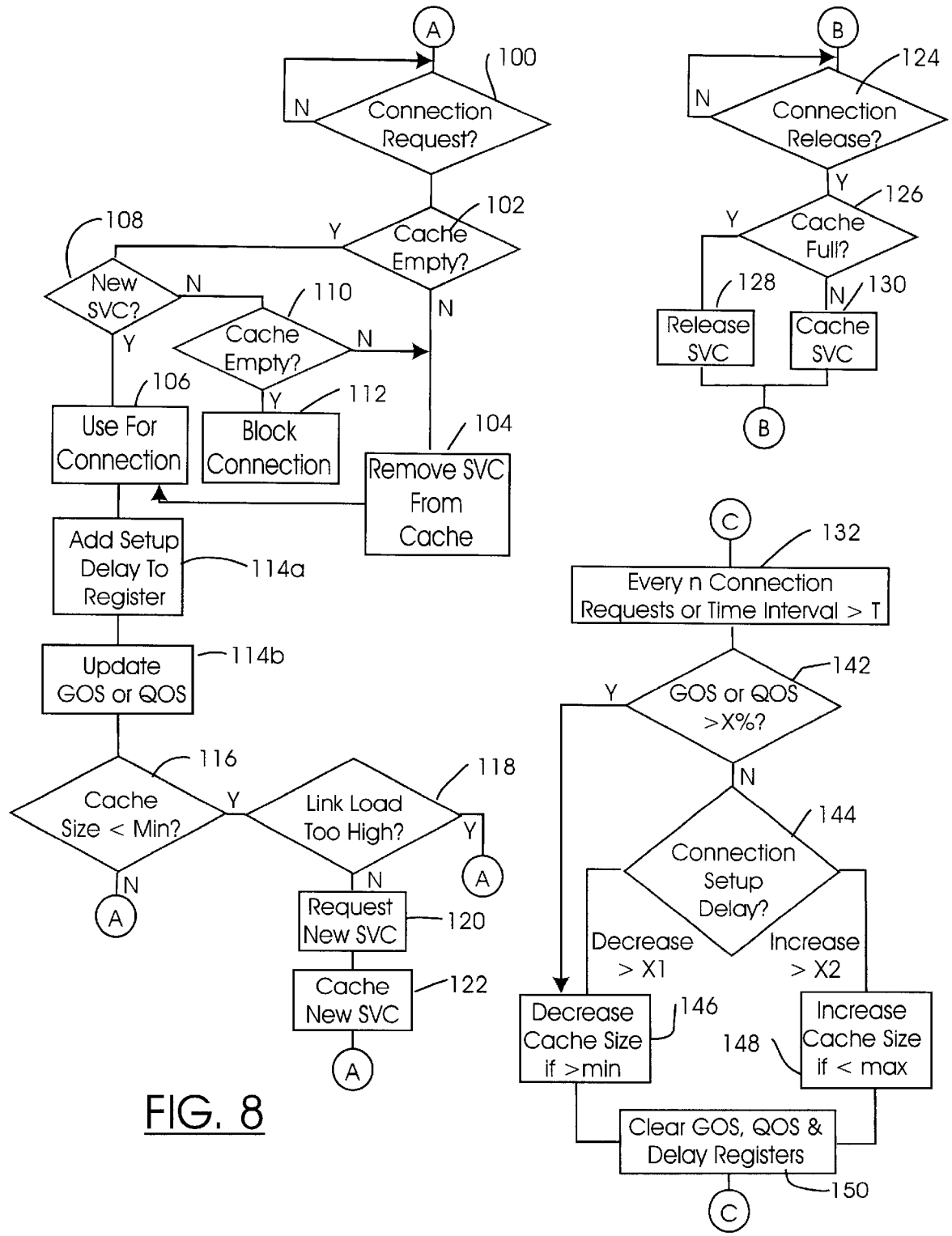
FIG. 8 is a flow chart illustrating the general algorithm shown in FIG. 7 adapted to provide a self-managing system for cache control using grade or quality of service levels and connection setup delay as control parameters.

FIG. 8 is a flowchart illustrating the general algorithm in FIG. 7 adapted to provide a self-managing system for cache control using grade or quality of service levels and call setup delay control parameters. As is apparent, the first process is substantially identical to the general algorithm described above with the exception that step 114 (FIG. 7) is converted into steps 114a and step 114b. In step 114a the cache manager adds a setup delay for the connection to a delay register. In step 114b, the cache manager updates a grade of service (GOS) value which is a measure of the number of connection attempts blocked, or a quality of service (QOS) value which is a measure of the transmission quality of a connection which may be measured using a number techniques well known in the art. Either GOS or QOS, or both, can be used in cache management, as will be explained below.

In the connection release monitoring process, the cache manager operates in steps 124–130 exactly as described above with reference to FIG. 7.

In the cache management process, the cache management algorithm is executed every $N^{th}$ connection requests or each time interval T, or both, as described above. In step 132, the appropriate variable(s) are monitored to determine when the cache management algorithm should be executed. In step 142, GOS or QOS are examined to determine whether they are greater than a predetermined value "%". If so, in step 146, the cache size is decreased by one when the cache size is greater than cache size minimum. If GOS or QOS do not exceed a predetermined value, the average connection setup delay is examined in step 144 to determine whether the average setup delay is less than a predetermined value identified as "LowB" or greater than a predetermined value identified as "UpB" in step 144. If the setup delay is less than LowB, the cache size is decreased by one in step 146, if it is greater than cache size minimum. If the average setup delay is less than UpB, the cache size is incremented by one in step 148 if it less than cache size maximum. When the cache size is decreased, one cached SVC may be removed from the cache and released through the ATM network. Alternatively, the process may wait a predetermined time to determine whether a one of the cached SVCs is used for a connection. If a cached SVC is used for connection, the SVC is not released until an SVC is to be returned to the cache, at which time the release is effected. If cache size is increased by one, one SVC setup may be requested from the ATM network and the SVC set up is added to the cache. Alternatively, the cache manager may wait a predetermined period of time to determine whether a connection release will add another connection to the cache. In step 150, the GOS, QOS and setup delay registers are cleared so that new values can be accumulated in steps 114a and 114b, as described above.

This algorithm provides a "plug and play" method of cache control given the GOS or QOS and the average setup delay objectives, the system will automatically manage itself to provide the required grade and/or quality of service. The grade of service is used to capture the link load. Grade of service is normally a measure of connection request blocking that has been used for provisioning the traditional switched telephone network for decades. The average SVC setup delay is used to capture switch load and route traffic fluctuation simultaneously. An increase in switch load or an increase in route traffic will each increase the connection setup delay. The call setup delay can be measured using timers. For example, a timer can be started when a new SVC request is sent and read when the connection setup is complete. GOS is most simply computed by measuring the number of connection requests blocked while counting the total number of connection requests received.

Figure 9:
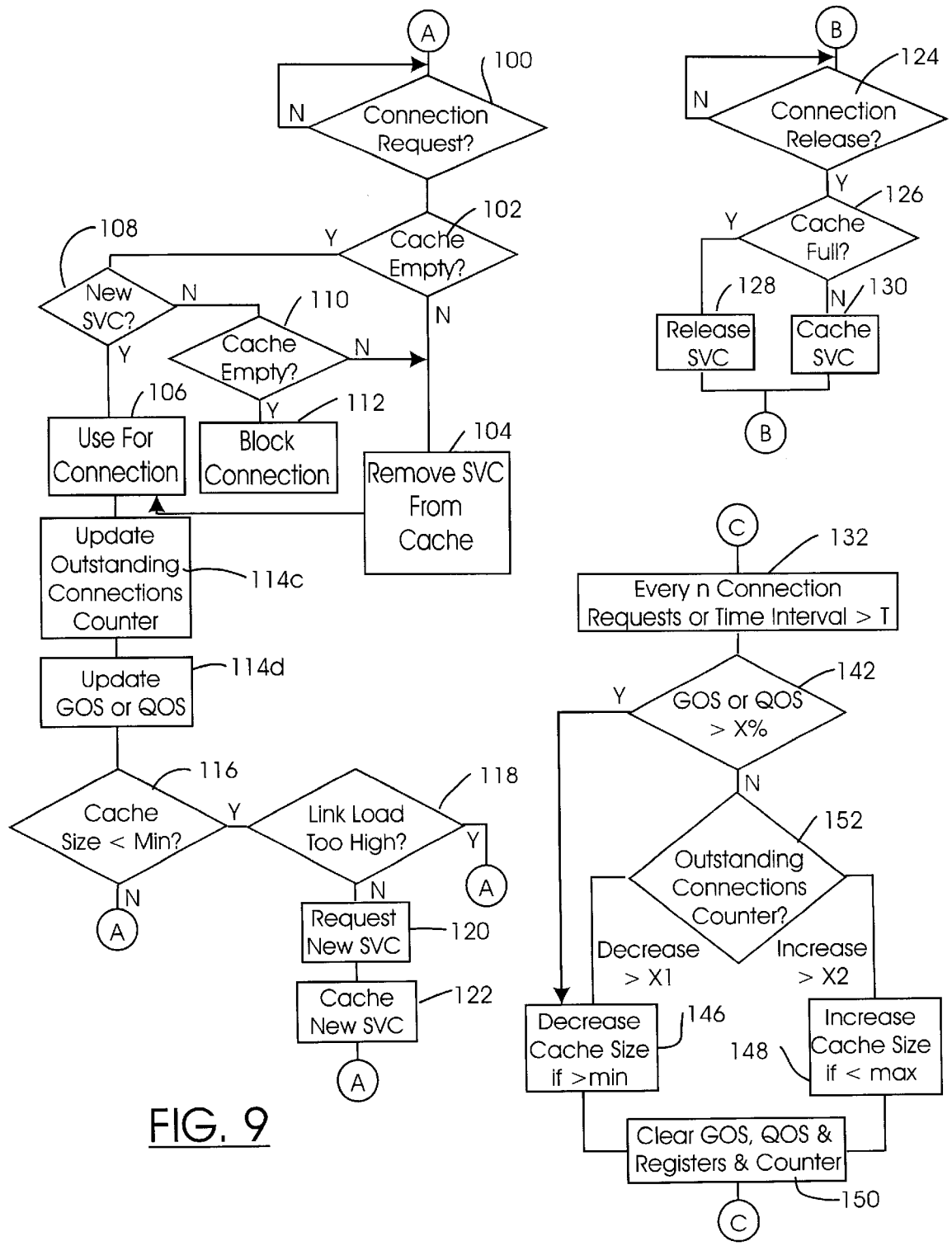
FIG. 9 is a flow chart illustrating the general algorithm shown in FIG. 7 adapted for using the number of waiting connection requests and GOS and QOS as to control parameters for governing cache size.

FIG. 9 is flowchart illustrating the general algorithm shown in FIG. 7 adapted for using the number of waiting connection requests and a GOS or QOS as control parameters for governing cache size. As is apparent, the first and second concurrent processes are identical to that shown in FIGS. 7 and 8 with the exception that in step 114c an outstanding connection request counter is updated and in step 114d, the GOS and QOS registers are updated.

With respect to the cache size management algorithm, it is identical to the algorithm described above with reference to FIG. 8 with the exception that in step 152 the number of outstanding connection requests accumulated in step 114c is compared with predetermined values "LowB" and "UpB" to determine whether the number of outstanding connection requests is less than LowB or greater than UpB. If the number of outstanding connection requests is greater than LowB, then cache size is decreased by one, if the cache size is greater than the cache size minimum. If the number of outstanding connection requests is greater than the value of UpB then the cache size is increased by one, if the cache size is less than maximum cache size, as shown in step 148. In step 150, the registers are cleared so that fresh accumulations are available for the next time the cache size management algorithm is executed.

Cache Fragmentation

Figure 10:
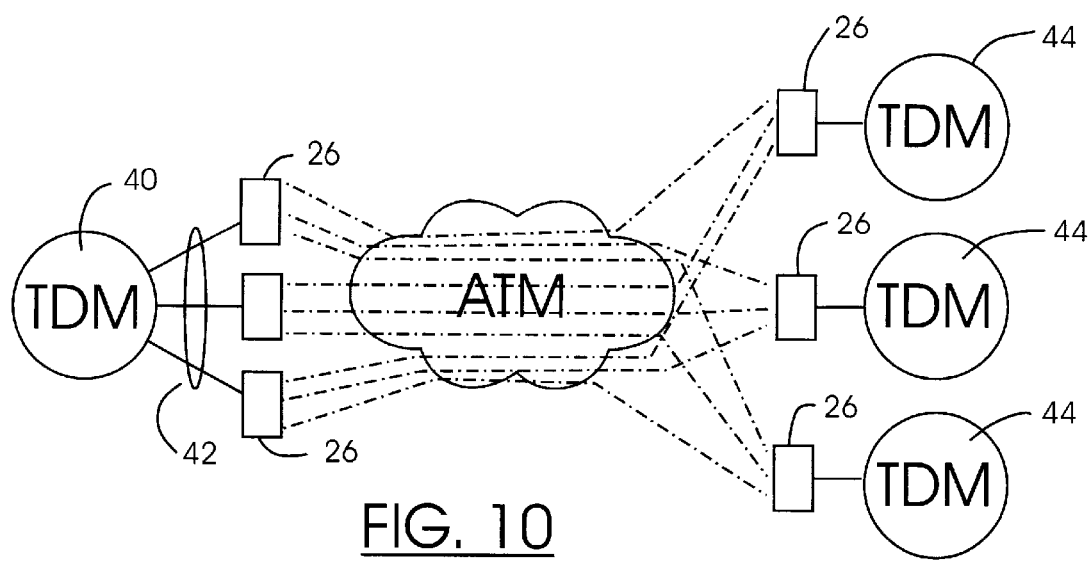
FIG. 10 is a schematic diagram illustrating cache fragmentation which occurs when a single TDM switch requires more than one edge device interface to handle traffic load.

In utilizing the method and apparatus in accordance with the invention to reduce connection setup time, a condition hereinafter referred to "cache fragmentation" can occur when a very large telephone switching office is connected to an ATM network. The condition arises because typically the edge device interfaces 26 have a finite trunk capacity which is not equal to a trunk capacity of a large time division multiplexed (TDM) switch. Consequently, as shown in FIG. 10, when a large TDM switch 40 is connected to the ATM network 20 a plurality of edge device interfaces 26 are required to serve the switch. As is also explained, it is preferable that a single logical trunk group 42 is used for the connection because it simplifies maintenance on the TDM switch 40 and significantly reduces operations and maintenance costs. Cache fragmentation occurs because each of the edge device interfaces 26 connect to TDM 40 and require a cache pool to each edge device 26 connected to other TDM switches 44.

Figure 11:
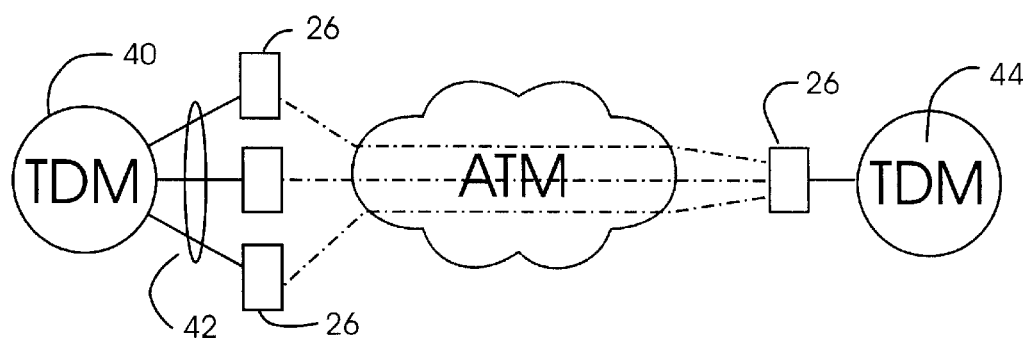
FIG. 11 is a schematic diagram illustrating the effects of cache fragmentation on edge device interfaces that serve small TDM switches.

Cache fragmentation is more clearly illustrated in FIG. 11 which is a schematic diagram illustrating the effects of cache fragmentation on edge device interfaces that serve small TDM switches. As is apparent, the edge device interface 26 for TDM switch 44, shown in FIG. 11, must support three cache pools to serve TDM 40 in order to take advantage of the benefits offered by the single logical trunk group 42 for TDM switch 40. In a large subnetwork, the number of instances of the cache manager on an edge device interface 26 may become unwieldy. Consequently, it is desirable to provide a mechanism for controlling cache fragmentation at the edge device interfaces 26.

Figure 12:
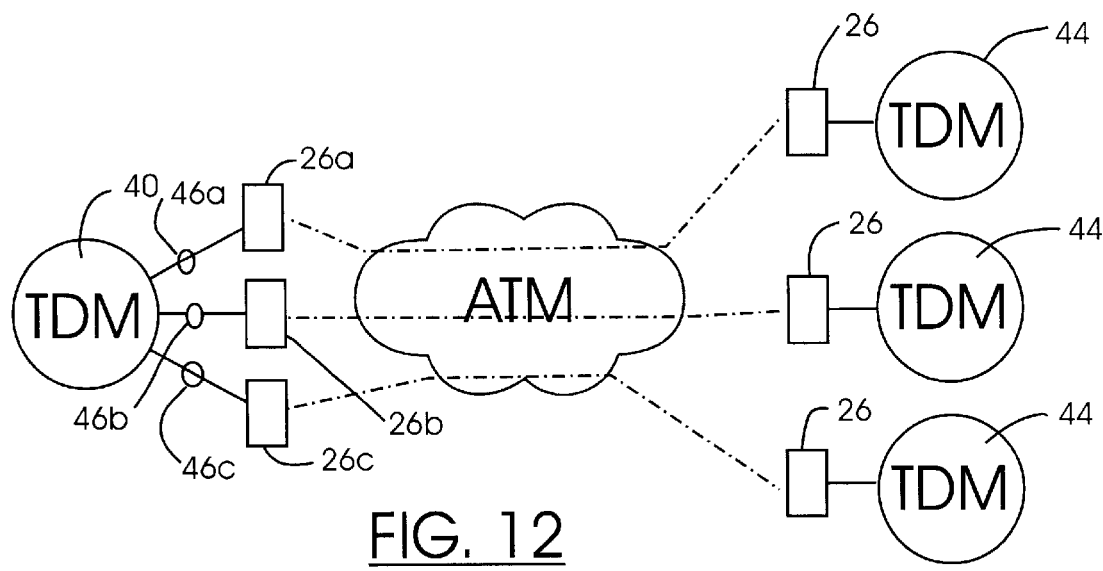
FIG. 12 is a schematic diagram illustrating the use of multiple trunk groups to minimize cache fragmentation.

FIG. 12 shows one method of controlling edge device interfaces in which multiple trunk groups 46a–46c are used to connect the TDM 40 to the edge device interfaces 26a, 26b and 26c. Thus, cache fragmentation is implemented at the expense of increased management on the TDM switch 40. Under this arrangement, routing tables on the TDM 40 route connection requests over the appropriate trunk group in a manner well known in the art. Consequently, management at TDM 40 is no more complex than is required in the switched telephone network as it currently exists and cache fragmentation is correspondingly minimized.

Figure 13:
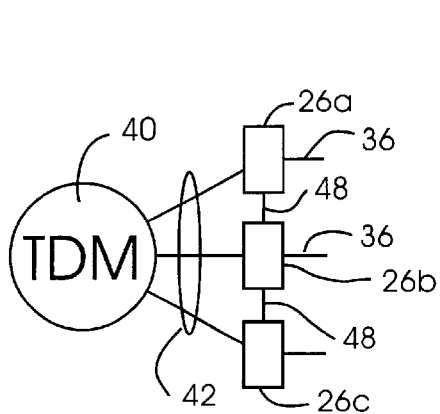
FIG. 13 is a schematic diagram illustrating a preferred method and apparatus in accordance with the invention for minimizing cache fragmentation without sacrificing the benefits of a single large trunk group connecting the edge device interfaces to the TDM switch.

FIG. 13 shows an alternate solution to reducing cache fragmentation. In FIG. 13, the TDM 40 is connected to the edge devices 26a–26c using a single logical trunk group 42 but the edge device interfaces 26a–26c are interconnected by inter-device bridges 48 and managed as a single large edge device interface. Consequently, only one cache pool 36 is required for each other edge device interface in the subnetwork. If a call is routed by TDM 40 to edge device 26a but the cache pool required to serve the call is managed by edge device interfaces 26c, 26a routes the call over the inter-device bridges 48 to edge device interface 26c which completes the connection processing in a manner described above.

Figure 14:
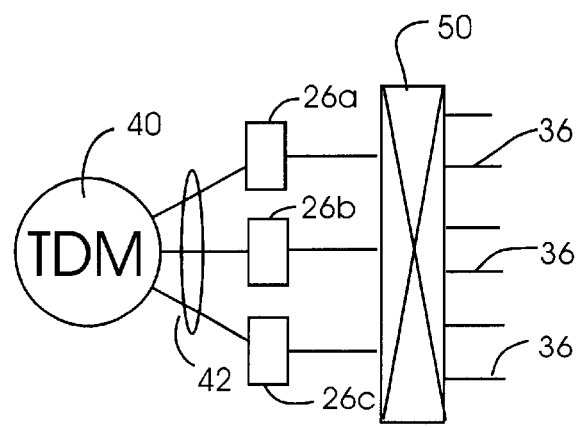
FIG. 14 is a schematic diagram illustrating an alternative architecture for minimizing cache fragmentation when a single large trunk group is used at a large TDM switch.

FIG. 14 illustrates another arrangement which permits a large TDM switch 40 to be connected by a single logical trunk group 42 to a plurality of edge devices 26a–26c. In this example, an ATM switch 50 is used to consolidate and manage cache pools 36 so that cache fragmentation is

We claim:

1. A method for reducing call setup rate in an asynchronous transfer mode (ATM) network where ATM network-independent edge devices serve as interfaces for ingress and egress of bearer traffic from other networks, comprising:

maintaining at each ATM network-independent edge device interface a pool of cached switched virtual circuits (SVCs) for the transfer of bearer traffic through the ATM network, and dynamically adjusting the number of cached SVCs in the pool of cached SVCs by adding SVCs to the pool when bandwidth usage is low with respect to switching resource usage, and removing SVCs form the pool when bandwidth usage is high with respect to switch resource usage.

2. A method as claimed in claim 1 wherein a plurality of pools of cached SVCs are maintained at each of the edge devices, the plurality of pools at a first edge device respectively containing cached SVCs for connections between the first edge device and second edge devices that respectively serve as interfaces for the ingress and egress of the bearer traffic.

3. A method as claimed in claim 1 wherein the cache pool size is dynamically adjusted by performing the steps of:
   a) at predetermined intervals checking link load to determine if the link load is higher than a predetermined value;
   b) if the link load is higher than the predetermined value, decreasing cache pool size by one if the cache pool size is greater than a predetermined minimum cache size; else
   c) if switch load or bearer traffic is increasing with respect to a respective switch load and bearer traffic level measured at a last of the predetermined intervals, increasing cache pool size by one if the cache pool is smaller than a predetermined maximum cache size; else
   d) if switch load or bearer traffic is decreasing with respect to a switch load or bearer traffic level measured at a last of the predetermined intervals, decreasing cache pool size by one if the cache pool is larger than a predetermined minimum cache size.

4. A method as claimed in claim 3 wherein the predetermined interval is a predetermined time interval.

5. A method as claimed in claim 3 wherein the predetermined interval is determined when a count of connection requests exceeds a predetermined threshold.

6. A method as claimed in claim 3 wherein the link load is determined by measuring a GOS with respect to new connection requests or a QOS of existing connections.

7. A method as claimed in claim 3 wherein the bearer traffic increase and the bearer traffic decrease are determined by measuring an average connection delay.

8. A method as claimed in claim 3 wherein the bearer traffic increase and the bearer traffic decrease are determined by comparing a count of outstanding connection requests with predetermined high and low thresholds, respectively.

9. A method as claimed in claim 3 wherein step d) further includes a step of checking a link load level to determine if the link load had exceeded a predetermined threshold and only requesting the set up of a new SVC if the link load has not exceeded the predetermined threshold.

10. A method as claimed in claim 9 wherein the step of checking a link load level to determine if the link load had exceeded a predetermined threshold involves comparing a percentage of calls blocked during a predetermined time interval with a predetermined threshold.

11. A method for reducing call setup rate in an asynchronous transfer mode (ATM) network where ATM network-independent edge devices serve as interfaces for ingress and egress of bearer traffic from other networks, comprising:

maintaining at each ATM network-independent edge device interface a plurality of pools of cached switched virtual circuits (SVCs) for the transfer of bearer traffic through the ATM network, the plurality of pools at a first edge device respectively containing cached SVCs for connections between the first edge device and second edge devices that respectively serve as interfaces for the ingress and egress of the bearer traffic; and when a bearer traffic connection is passed to one of the first or second edge devices, one of the cached SVCs in an appropriate pool is selected to serve the call if a cached SVC exists in the appropriate pool.

12. A method as claimed in claim 11 wherein in a network of N edge devices, each edge device has a maximum of N−1 pools of cached SVCs, each of the pools at an edge device having a corresponding pool of cached SVCs at another edge device with which the SVCs are established.

13. A method as claimed in claim 11 wherein each respective pool of cached SVCs in an edge device is managed by a separate process that maintains a table of cached SVCs in the pool.

14. A method as claimed in claim 13 wherein a process at a one of a pair of edge devices sharing a corresponding pool of cached SVCs is designated master of the pool of cached SVCs and the other of the processes at the other of the pair of edge devices is designated as slave, and the master controls the use of the SVCs in the corresponding pools on each of the pair of edge devices.

15. A method as claimed in claim 14 wherein when a call setup request is received by the slave, the slave sends an SVC request message to the master and the master selects a cached SVC from the corresponding pool of SVCs to serve the call, if a cached SVC exists in the corresponding pool, and informs the slave of an identity of the SVC selected to serve the call.

16. A method as claimed in claim 15 wherein the master sets up an SVC when a cached SVC does not exist to serve the call, and informs the slave of the identity of the SVC set up to serve the call.

17. A method as claimed in claim 16 wherein the slave and the master communicate using ATM operations and management (OAM) cells exchanged over an SVC.

18. A method as claimed in claim 16 wherein the slave and the master communicate using a control channel.

19. A method as claimed in claim 16 wherein the slave and the master communicate using a Generic Application Transport (GAT) protocol.

20. A method as claimed in claim 17 wherein if the slave receives a call setup request, the slave sends an SVC request message to the master in the form of an OAM cell over any corresponding SVC which is in use, and the master returns an OAM cell in response over the SVC selected to serve the call request.

21. A method as claimed in claim 13 wherein processes at each of a pair of edge devices sharing a corresponding pool of cached SVCs are peers, and control of the use of the SVCs in the corresponding pools on each of the pair of edge devices is shared between the peers.

22. A method as claimed in claim 21 wherein the process at the edge device that originates a connection request selects a cached SVC to serve the connection request and informs the peer process at the other edge device of the identity of the cached SVC selected to serve the connection request.

23. A method as claimed in claim 21 wherein the process at the edge device that terminates a connection request selects a cached SVC to serve the connection request and informs the peer process at the other edge device of the identity of the cached SVC selected to serve the connection request.

24. A method as claimed in claim 11 wherein a caching policy manager determines the number of cached SVCs that are to be included in each cache pool.

25. A method as claimed in claim 23 wherein the caching policy manager determines which of the processes that manage a corresponding cached SVC pool is master and which is slave using an algorithm that selects a master and a slave based on an identifier associated with each process.

26. A method as claimed in claim 25 wherein the identifier is an ATM address.

27. A method as claimed in claim 24 wherein the caching policy manager executes an algorithm to determine the number of cached SVCs that are to be included in each cached SVC pool.

28. Apparatus for reducing call setup rate in an asynchronous transfer mode (ATM) network where ATM network-independent edge devices serve as interfaces for ingress and egress of bearer traffic from other networks, comprising:
   a caching manager active on each ATM network-independent edge device interface for managing a pool of cached SVCs between each of the edge device interfaces and others of the edge device interfaces in the network; and
   a caching policy manager for providing the caching managers with caching policy to determine a maximum cache size for each pool of cached SVCs in the ATM network.

29. Apparatus as claimed in claim 28 wherein a pool of cached SVCs exists in a given edge device for each other edge device with which the edge device has SVCs established.

30. Apparatus as claimed in claim 29 wherein each pool of cached SVCs is managed by a separate instance of the caching manager.

31. Apparatus as claimed in claim 30 wherein each instance of the caching manager is either a master which controls the cached SVCs in a pool or a slave which maintains a table of cached SVCs in a corresponding pool in accordance with instructions received from the master.

32. Apparatus as claimed in claim 31 wherein the masters are designated by the caching policy manager.

33. Apparatus as claimed in claim 28 wherein a one of the other networks is a time division multiplexed (TDM) telephone network and at least a portion of the edge devices are TDM/ATM interface devices for converting PCM voice data to ATM cells for transfer through the ATM network, and for converting ATM cells back to PCM voice data.

34. Apparatus as claimed in claim 33 wherein the edge devices are connected to end offices in the TDM network and more than one edge device is required to serve a traffic load of a large one of the end offices.

35. Apparatus as claimed in claim 34 wherein the edge devices connected to the large end office are connected thereto by a single logical trunk group and each of those edge devices connected to the large end office has a pool of cached SVCs to other edge devices in the network.

36. Apparatus as claimed in claim 34 wherein the edge devices connected to the large end office are respectively connected thereto by multiple logical trunk groups, the multiple logical trunk groups being respectively designated to carry bearer traffic to specific other end offices in the TDM network, and a first edge device connected to one of the respective multiple logical trunk groups has a pool of cached SVCs established with a second edge device connected to an end office for which the logical trunk group carries the bearer traffic, but not with edge devices that serve end offices for which traffic is carried by others of the multiple logical trunk groups.

37. Apparatus as claimed in claim 34 wherein the edge devices are connected to the large end office by a single logical trunk group and the edge devices are managed as a single large edge device in order to reduce SVC cache fragmentation.

38. Apparatus as claimed in claim 34 wherein the edge devices are each connected to an edge switch in the ATM network and the edge switch is used to consolidate bearer traffic to and from the edge devices and to manage SVC caching in order to reduce SVC cache fragmentation.

39. A system for reducing call setup rate in an asynchronous transfer mode (ATM) network which serves as a backbone network for transferring bearer traffic between other networks, comprising:
   a plurality of edge devices which respectively serve as interfaces between the ATM network and the other networks, the edge devices converting bearer traffic from the other networks into ATM cells containing the bearer traffic and converting the ATM cells back into the bearer traffic of the other networks;
   a cache manager which manages cached switched virtual circuits (SVCs) in the ATM network for transferring the cells containing the bearer traffic through the ATM network, and for setting up a new SVC if a cached SVC is not available for the transfer of the cells containing bearer traffic; and
   a cache policy manager for providing the cache manager with policies respecting the caching of SVCs.

40. A system as claimed in claim 39 wherein the system includes a cache manager which operates at each of the edge devices and controls the SVC cache for the edge device at which it operates.

41. A system as claimed in claim 40 wherein the SVC cache comprises a plurality of cache pools, the cache pools respectively including at least one SVC established with only one other of the edge devices.

42. A system as claimed in claim 41 wherein an instance of the cache manager manages each of the cache pools.

43. A method of managing a pool of cached switched virtual circuits set up across an ATM network to reduce unused bandwidth and connection setup processing, comprising the steps of:
   a) upon receipt of a connection request, examining the pool of cached SVCs to determine if an unused cached SVC exists;
   b) selecting the unused cached SVC if it exists, else requesting a setup of an SVC from the ATM network;
   c) if the ATM network denies the setup of an SVC, again examining the pool of cached SVCs to determine if an unused cached SVC has become available, and using the cached SVC if one has become available, else denying the connection request;

d) comparing a number of cached SVCs in the pool with a minimum cache size and if the number of cached SVCs is less than the minimum cache size, requesting the ATM network to set up a new SVC to be added to the cache pool.

44. A method as claimed in claim 43 wherein when a connection through the ATM network is terminated, before an SVC associated with the connection is released a number of SVCs in the cache pool is compared with a maximum cache size and if the number of cached SVCs in the cache pool is less than the maximum cache size, the released SVC is added to the cache pool, else the SVC is released.

* * * * *